Figures 5, 6:
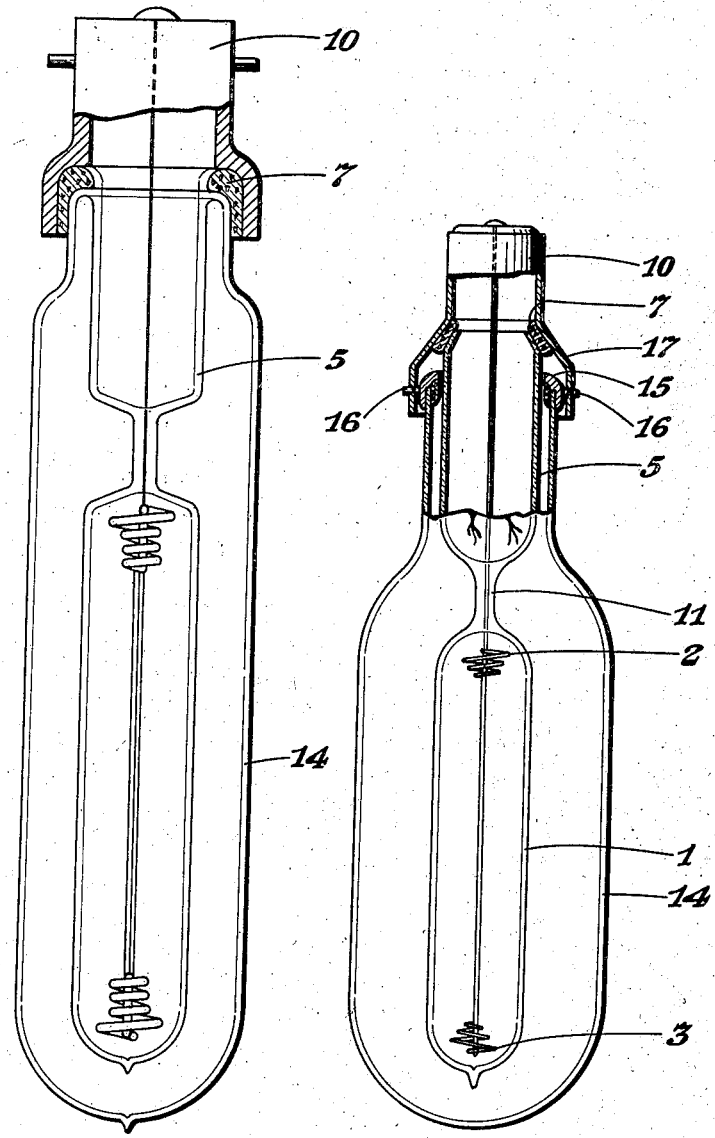

Dec. 21, 1937.                     C. BOL                      2,103,028
                        ELECTRIC CONDUCTION DEVICE
                           Filed May 22, 1935           2 Sheets-Sheet 1
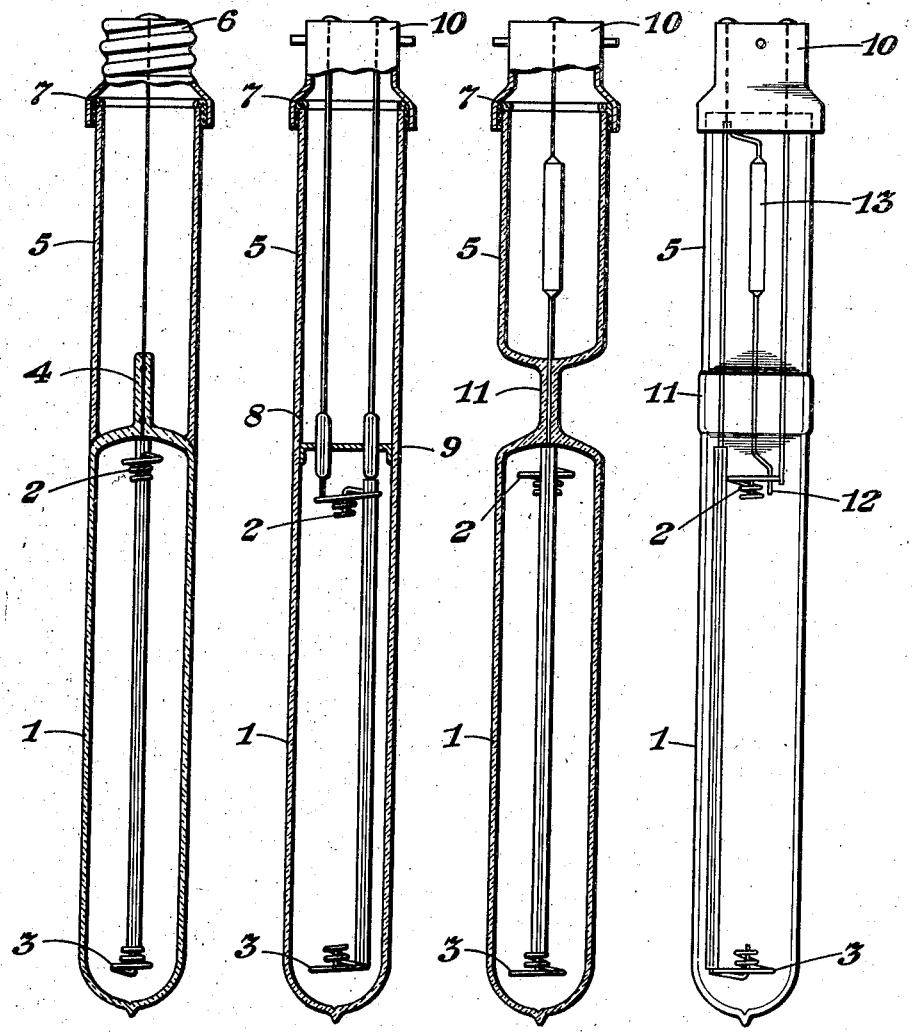
INVENTOR
Cornelis Bol
BY Harry E. Dunham
ATTORNEY Dec. 21, 1937.  C. BOL  2,103,028
ELECTRIC CONDUCTION DEVICE
Filed May 22, 1935  2 Sheets-Sheet 2

INVENTOR
Cornelis Bol
BY Harry E. Dunham
ATTORNEY

Patented Dec. 21, 1937

2,103,028

UNITED STATES PATENT OFFICE 2,103,028

ELECTRIC CONDUCTION DEVICE

Cornelis Bol, Eindhoven, Netherlands, assignor to General Electric Company, a corporation of New York Application May 22, 1935, Serial No. 22,898
In Germany June 4, 1934

5 Claims. (Cl. 176—122)

The present invention relates to electric conduction devices generally, and in particular to gaseous discharge devices operating at an elevated temperature.

A particular object of the invention is to provide a novel electric conduction device, such as an incandescent or a gaseous discharge device. A further object of the invention is to provide a novel means for supporting such a device. Another object of the invention consists in a novel means for supporting an enclosing jacket about said device. Still other objects and advantages of my invention will appear from the following detailed specification or from an inspection of the accompanying drawings.

The invention consists in the novel structure hereinafter set forth and claimed.

In order to obtain a high intensity light from a gaseous discharge device it is generally necessary to operate the device at a relatively high temperature. For instance, the high intensity mercury vapor arc lamps which have recently been developed reach a temperature of 600° C. and over during operation. The operating temperatures of sodium, cadmium, and other metal vapor lamps is also relatively high, as is that of some incandescent filament lamps. These high tube temperatures make the attachment of a base extremely difficult, since the usual means for attaching a base directly to a discharge tube or an incandescent lamp have been found to be unreliable at these high temperatures, especially after extended operation of the lamp. In fact the problem of finding suitable materials, both for the base itself and for the attaching means, which can withstand these high temperatures for a long time has proved virtually insoluble.

According to my invention these difficulties are eliminated by providing the discharge tube with a tubular extension to the end of which the base is attached. This extension is made so long that the temperature at the point of attachment of the base has a value during operation so low that the strength of the attaching means is not impaired by the heating thereof, even after long continued operation. The extension may be open at the end, since it is not necessary to evacuate it, and hence my novel structure is extremely simple to manufacture. This extension may be easily produced in several different ways. For example, it may be integral with the wall of the discharge tube, the tube being closed off at a suitable distance from the end either by a glass or metal disc, or by means of a pinch. The leads to the device are conveniently sealed, of course, either through the disc or the pinch.

In addition to reducing the temperature of the base the extension also affords an extremely desirable housing for any auxiliary elements, such as resistances, which may be required for the operation of the discharge tube.

The extension also provides an ideal supporting means for an enclosing jacket, where the latter is desired, this jacket being either sealed to the extension, or removably attached thereto by means of a suitable structure.

For the purpose of illustrating my invention I have shown several embodiments thereof in the accompanying drawings, in which Fig. 1 is a cross sectional view of a high intensity mercury vapor arc lamp having the base attached to an extension of the arc tube, Figs. 2 and 3 are similar views of modifications of the structure of Fig. 1, Fig. 4 is an elevational view of the lamp of Fig. 3, taken at right angles to the section shown in Fig. 3, and Figs. 5 and 6 show different means for enclosing the arc tube within a suitable jacket.

The discharge vessel 1 of the tube shown in Fig. 1, which is intended for use as a lamp, has a cylindrical shape and is provided with two glow electrodes 2 and 3 adjacent opposite ends thereof. As shown these electrodes are of the type which is heated by the discharge and consist of closed helical windings coated with a material of high electron emissivity, although any other suitable type of electrode may be used in place thereof, if desired. The inleads to these electrodes are brought through the pinch seal 4, the inlead to the lower electrode 3 being enclosed within the vessel 1 by a suitable insulating tube. A glass tube 5 of substantially the same diameter as the vessel 1 is fused to the upper end of said vessel, and in effect forms an integral extension thereof. The base 6 is attached to the open end of said extension 5 by means of the cement 7. This extension in some cases is made to overlap the vessel 1, so that the seal between this extension and the vessel 1 is located farther from the stem press 4. In any case the extension 5 is made of the same material as the vessel 1, or of a material which can be sealed thereto either directly or through a graded seal. Where the discharge vessel 1 is made of quartz, for example, the extension 5 may be made of any desired glass, with a graded seal connecting the two bodies.

The lamp illustrated in Fig. 2 differs from that of Fig. 1 in that the discharge vessel 1 and the extension 5 are made of one piece of glass tubing. The inleads for the electrodes 2 and 3 are here first sealed into a metal disc 8 by means of suitable beads, and said electrodes are then welded thereto. Said disc 8 is then inserted within the glass tube forming the vessel 1 and sealed thereto at point 9, leaving an extension 5, as in Fig. 1. While here shown as made of a metal, such as the nickel-cobalt-iron alloy known as Fernico, which can be sealed to the glass tubing, it is to be understood that the disc 8 can itself be made of glass where desired. A bayonet type base 10 is cemented to the extension 5, by means of the cement 7.

In the discharge device illustrated in Figs. 3 and 4 the discharge vessel 1 and the extension 5 are likewise made of a single piece of tubing, the separation between these two parts being produced by means of the pinch 11 which also serves to seal in the inleads to the electrodes 2 and 3. A wire 12, of tungsten or the like is also sealed through this pinch. This wire, which terminates in the vicinity of the electrode 2, is connected through a relatively high resistance 13 to the inlead to the electrode 3, and serves as an auxiliary electrode. When the device is placed in operation an auxiliary discharge is formed between the electrode 2 and the auxiliary electrode 12. The electrode 2 is heated by this discharge, and the gaseous content of the device is likewise ionized, with the result that the initiation of the main discharge between the electrodes 2 and 3 is greatly facilitated. The resistance 13, which limits the current in the auxiliary discharge to a small value, is placed in the extension 5. Although such an auxiliary electrode and such a resistance have not been shown in Figs. 1 and 2 it is to be understood that the devices illustrated in those figures can also be equipped therewith if desired.

The discharge vessels or tubes shown in these drawings contain any suitable gaseous atmosphere. For example, where a high intensity mercury vapor arc lamp is desired they are preferably filled with a rare gas, such as neon or argon, at a pressure of the order of a few millimeters, plus sufficient mercury to give the desired vapor pressure during operation, such as an atmosphere or more. In the preferred form the quantity of mercury is so limited that the device operates with an unsaturated mercury vapor atmosphere when the rated wattage is applied to the device.

Under such conditions the discharge vessel 1 reaches a very high temperature, of the order of 600° C. and over. By placing the extension 5 between this discharge vessel and the base the latter together with the attaching means therefor is maintained at a considerably lower temperature, so that the strength thereof is not impaired during operation of the device.

In order to reduce the heat losses from the vessel 1 and to eliminate the unequal cooling effects of drafts the vessel 1 is commonly enclosed within a suitable jacket. This is easily accomplished with my novel structure, where the jacket 14 is directly sealed to the extension 5, as shown in Fig. 5. Since the extension 5 has a relatively low temperature this direct sealing of the jacket thereto does not result either in an excessive heating of this jacket or in a large loss of heat from the device. The space between the discharge vessel 1 and the jacket 14 is either evacuated or filled with a suitable gaseous atmosphere, as desired.

The low temperature at which the extension 5 operates also makes possible the use of a jacket which is removably attached to the discharge vessel 1. Thus as shown in Fig. 6 the glass enclosing jacket 14 is cemented to a ring 15. This ring is provided with pins 16 which engage after the fashion of a bayonet socket with suitable slots (not shown) in the apron 17 which extends downwardly from the base 10. The jacket 14 is in this case unsealed and hence filled with air. While this allows the escape of somewhat more heat than an evacuated jacket this is sometimes desirable in that it permits a greater energy input with an attendant higher efficiency.

I have found that a jacket 14 having a diameter which is at most four times that of the discharge vessel 1 is most effective. In the case illustrated in Fig. 6 the vessel 1 has a diameter of 18 m. m. while that of the outer jacket 14 is 45 m. m., or two and a half times that of the vessel 1. The length of the vessel 1 is 90 m. m., the spacing of the electrodes 70 m. m., while the pinch seal is 10 m. m. long and the extension 5 is 35 m. m. in length. Such a device containing a gas and mercury vapor atmosphere such as hereinbefore described has been found to operate with an arc current of 1.65 amperes with a voltage drop between electrodes of 100 volts, with a luminous efficiency of approximately 37 Hefner lumens (or 33.3 international lumens) per watt.

The discharge vessel 1 is preferably made of quartz or of a hard glass which can withstand the high operating temperature, while the jacket 14 ordinarily consists of any suitable glass. In case it is desired to use the device as a source of ultra-violet radiations, however, both the envelope 1 and the jacket 14 are preferably made of a material which is transparent to ultra-violet light.

While I have described my invention by reference to certain embodiments thereof it is to be understood that it is not limited thereto, but that various omissions, substitutions and changes, within the scope of the appended claims, may be made therein without departing from the spirit of my invention.

What I claim as new and desire to secure by Letters Patent of the United States, is:—

1. An electric gaseous discharge device comprising a sealed envelope, a tubular extension connected to said envelope by means of a pinch seal, and a base member affixed to the end of said extension.

2. An electric gaseous discharge device comprising an elongated tubular sealed envelope, a tubular member integral with said envelope and forming an extension from one end thereof, said extension having the same outside diameter as said envelope, and a jacket enclosing said envelope and extension and attached to said extension at a point near the end thereof which is remote from said envelope.

3. An electric gaseous discharge device comprising an elongated tubular sealed envelope, a tubular member integral with said envelope and forming an extension from one end thereof, said extension having the same outside diameter as said envelope, and a jacket enclosing said envelope and extension, said jacket being sealed to said extension at a point near the end thereof which is remote from said envelope.

4. An electric gaseous discharge device comprising and elongated tubular sealed envelope, a tubular member integral with said envelope and forming an extension from one end thereof, said extension having the same outside diameter as said envelope, a jacket enclosing said envelope and extension, and means affixed to said extension adjacent the end thereof which is remote from said envelope to removably support said jacket.

5. An electric gaseous discharge device comprising a sealed envelope, a tubular member integral with said envelope and forming an extension from one end thereof, a jacket enclosing said envelope and said extension, the diameter of said jacket being two and a half to four times that of said envelope, and means adjacent the end of said extension which is remote from said envelope to removably support said jacket.

CORNELIS BOL.